United States Patent
Feroy et al.

(10) Patent No.: US 12,329,997 B2
(45) Date of Patent: Jun. 17, 2025

(54) APPARATUS, SYSTEM, AND METHOD FOR PRESSURE ALTITUDE-COMPENSATING BREATH-CONTROLLED OXYGEN RELEASE

(71) Applicant: The Boeing Company, Chicago, IL (US)

(72) Inventors: Jon A. Feroy, Edgewood, WA (US); Frederick Paul Siebert, North Bend, WA (US); Emad Said Kiriakos, Bothell, WA (US); Douglas L. Dohrman, Snohomish, WA (US); Steven P. McDonald, Marysville, WA (US); Raydel Cortina, Hialeah, FL (US); Timothy R. Randall, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 660 days.

(21) Appl. No.: 16/830,861

(22) Filed: Mar. 26, 2020

(65) Prior Publication Data

US 2021/0299483 A1 Sep. 30, 2021

(51) Int. Cl.
*A62B 7/02* (2006.01)
*A62B 7/14* (2006.01)
*A62B 9/00* (2006.01)
*B64D 11/00* (2006.01)

(52) U.S. Cl.
CPC .................. *A62B 7/02* (2013.01); *A62B 7/14* (2013.01); *A62B 9/00* (2013.01); *B64D 11/00* (2013.01)

(58) Field of Classification Search
CPC .. A62B 7/02; A62B 7/14; A62B 9/022; B64D 13/04
See application file for complete search history.

(56) References Cited

U.S. PATENT DOCUMENTS

| | | | | |
|---|---|---|---|---|
| 2,324,389 A | * | 7/1943 | Heidbrink | A62B 7/14 73/201 |
| 2,963,034 A | * | 12/1960 | Cummins | G05D 16/0683 137/81.1 |
| 3,016,061 A | * | 1/1962 | Maddock | F16K 31/58 137/81.1 |
| 3,073,301 A | * | 1/1963 | Hay | F16K 31/44 251/74 |
| 3,091,365 A | * | 5/1963 | Horner | A62B 9/00 169/26 |

(Continued)

FOREIGN PATENT DOCUMENTS

| | | | |
|---|---|---|---|
| DE | 102006025263 B3 | * 12/2007 | ............... A62B 7/14 |
| EP | 1028770 B1 | * 6/2004 | ........ A61M 16/0677 |

(Continued)

*Primary Examiner* — Kathryn E Ditmer
(74) *Attorney, Agent, or Firm* — COATS & BENNETT, PLLC

(57) ABSTRACT

Methods, apparatuses, and systems for mechanically releasing a predetermined amount of supplemental oxygen to a user via a mechanical initiator are disclosed with the release of the amount of supplemental oxygen based on and in response to the combined factors of a user's determined oxygen consumption based on sensing a user's inhalation combined with determining the ambient pressure in the area of the user.

20 Claims, 5 Drawing Sheets

(56) References Cited

U.S. PATENT DOCUMENTS

| | | | | | |
|---|---|---|---|---|---|
| 3,179,119 | A | * | 4/1965 | Fitt | A62B 9/022 137/81.1 |
| 3,675,649 | A | * | 7/1972 | Basham | H02K 33/18 128/204.22 |
| 3,752,175 | A | * | 8/1973 | Hamilton | A62B 9/027 137/506 |
| 4,648,397 | A | * | 3/1987 | Beale | A62B 7/14 128/204.26 |
| 5,351,682 | A | * | 10/1994 | Foote | A62B 9/027 128/205.24 |
| 5,460,175 | A | * | 10/1995 | Foote | A62B 7/14 128/205.24 |
| 2007/0017573 | A1 | * | 1/2007 | Frampton | F16K 37/0091 137/81.1 |
| 2009/0188504 | A1 | * | 7/2009 | Siska, Jr. | A62B 9/02 128/205.21 |
| 2009/0260631 | A1 | * | 10/2009 | Aubonnet | A62B 9/02 128/205.25 |
| 2010/0258127 | A1 | * | 10/2010 | Hk | A62B 9/022 128/205.24 |
| 2011/0000490 | A1 | * | 1/2011 | Gillotin | A62B 7/14 128/204.26 |
| 2012/0097166 | A1 | * | 4/2012 | Libis | A62B 7/14 128/205.13 |
| 2013/0081627 | A1 | * | 4/2013 | Bailey | A62B 7/14 128/204.26 |
| 2013/0340760 | A1 | * | 12/2013 | Brumley | B64D 11/00 128/204.29 |
| 2014/0137869 | A1 | * | 5/2014 | Schrader | A62B 9/04 128/205.21 |
| 2015/0040906 | A1 | * | 2/2015 | Irr | A62B 9/022 128/205.24 |
| 2015/0196723 | A1 | * | 7/2015 | Matusik | A61M 16/0816 73/861 |
| 2017/0100611 | A1 | * | 4/2017 | Marz | A62B 18/02 |
| 2018/0133523 | A1 | * | 5/2018 | Tatarek | A62B 7/04 |
| 2019/0185166 | A1 | * | 6/2019 | Neumann | B64D 13/06 |
| 2019/0224505 | A1 | * | 7/2019 | Walker | A62B 7/14 |
| 2019/0232217 | A1 | | 8/2019 | Kirkbride | |
| 2020/0215358 | A1 | * | 7/2020 | Degenhardt | A62B 7/04 |
| 2021/0330996 | A1 | * | 10/2021 | Studer | A62B 7/00 |

FOREIGN PATENT DOCUMENTS

| | | | | |
|---|---|---|---|---|
| EP | 1863555 B1 | * | 11/2009 | A61M 16/00 |
| WO | WO-2015197542 A1 | * | 12/2015 | A62B 7/14 |

* cited by examiner

FIG. 5
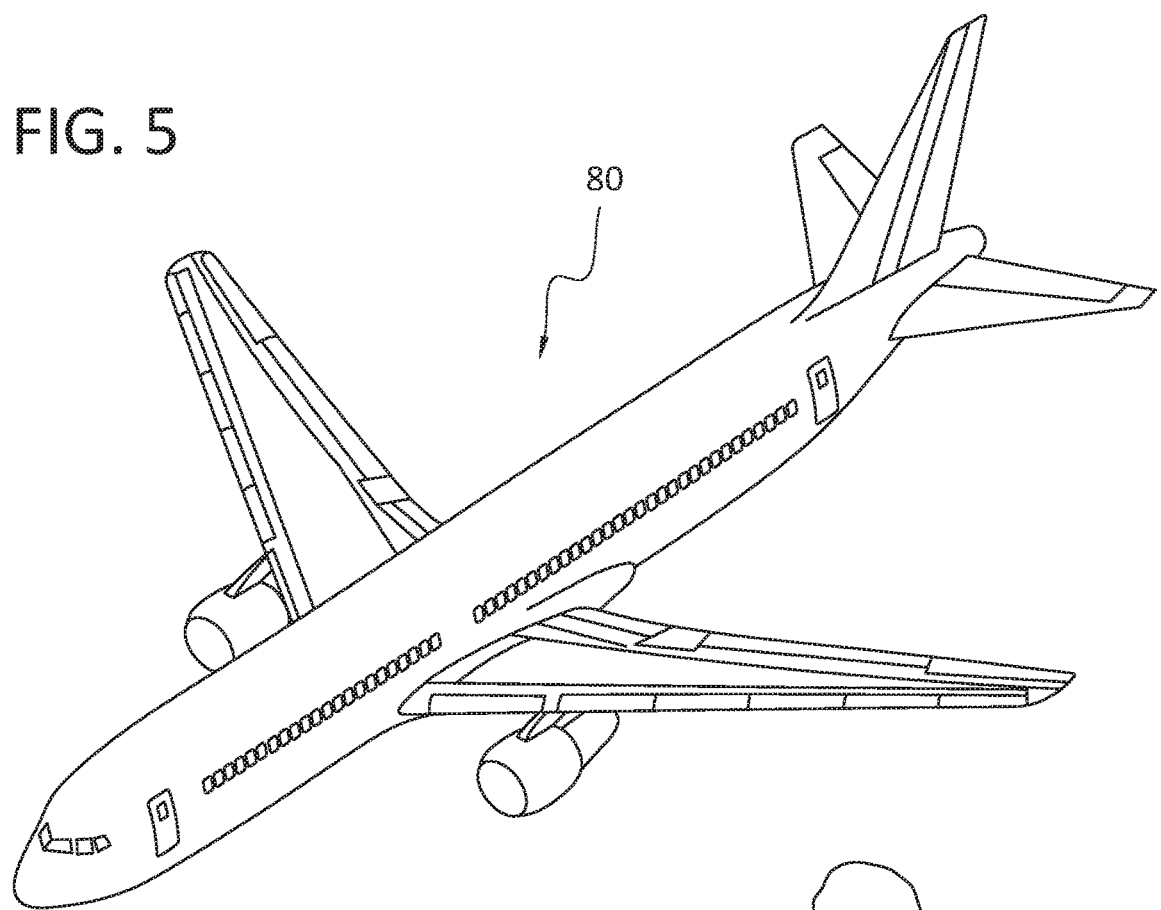
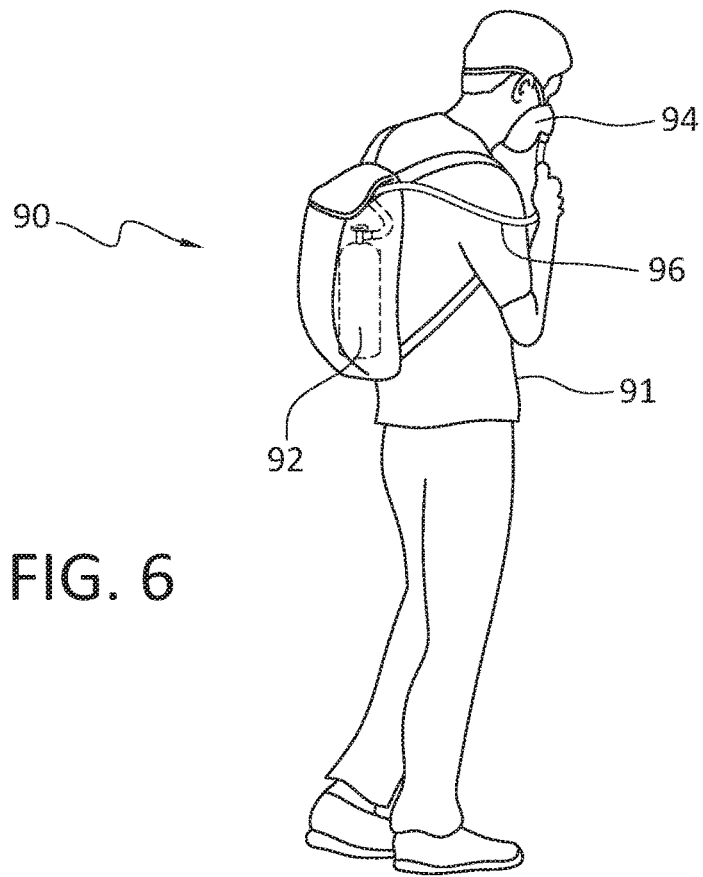
FIG. 6

APPARATUS, SYSTEM, AND METHOD FOR PRESSURE ALTITUDE-COMPENSATING BREATH-CONTROLLED OXYGEN RELEASE

TECHNOLOGICAL FIELD

The present disclosure relates generally to the field of oxygen delivery. More specifically the present disclosure relates to the field of oxygen flow control apparatuses, systems and methods.

BACKGROUND

In various environments, the oxygen content in ambient air can be altered just enough to have a perceptible effect on a human. For example, at higher altitudes on land, performance levels during physical exertion or even when a body is at rest may be impacted by a drop in oxygen concentration in ambient air of even less than 1 percent. Further, in enclosed spaces where air is conditioned and circulated, including, buses, trains, buildings, etc., minor fluctuations in oxygen content can occur.

In addition, during air travel, cabin pressurization and ambient air circulation is optimized to deliver oxygen content to passengers approaching or approximating oxygen levels on land. The control and dispensing of oxygen on an aircraft is of particular importance during a decompression event, where supplemental oxygen is dispensed generally to passengers from systems typically stowed in overhead compartments.

SUMMARY

The present disclosure includes apparatuses, systems, and methods for delivering supplemental oxygen to a user by mechanically initiating a conserved flow of oxygen, with the conserved individualized flow of oxygen determined for an individual user based on the inhalation of the user in combination with the determined ambient pressure of the area inhabited by the user, and with the conserved individualized flow of oxygen delivered to the user on demand, and in substantially real time.

According to present aspect an apparatus is disclosed including an oxygen control unit, with the oxygen control unit including an orifice metering device, and with the orifice metering device configured to determine ambient pressure, and with the orifice metering device further configured to regulate oxygen flow in response to a determined ambient pressure. The oxygen control unit further includes a breath sensor, with the breath sensor in communication with the orifice metering device, and with the breath sensor configured to mechanically regulate oxygen flow in response to the inhalation of a user. The oxygen control unit further includes a time delay circuit in communication with orifice metering device and with the time delay circuit further in communication with the breath sensor, and with the time delay circuit configured to determine the duration of a pulsed oxygen flow. The apparatus further includes a mechanical oxygen flow initiator in communication with the oxygen source In another aspect, the orifice metering device comprises an aneroid metering device.

A further aspect is directed to a system including an oxygen source, a regulator, with the regulator in communication with the oxygen source, and with the regulator configured to regulate flow of oxygen from the oxygen source. The system further includes an oxygen control unit in communication with the regulator, and with the said oxygen control unit including an orifice metering device, with the orifice metering device configured to determine ambient pressure and further configured to regulate oxygen flow in response to the determined ambient pressure. The system further includes a breath sensor, with the breath sensor in communication with the orifice metering device, and with the breath sensor further configured to initiate oxygen flow in response to inhalation of a user. The system further includes an oxygen dosing chamber in communication with the breath sensor, with the oxygen dosing chamber further in communication with the oxygen source, and the system further includes an oxygen delivery device in communication with the orifice metering device, with the oxygen delivery device further in communication with the breath sensor, wherein the oxygen source is in communication with a mechanical oxygen supply initiator.

In another aspect, an oxygen supply is delivered to an individual user.

In a further aspect, the system further includes an oxygen discharge indicator, with the oxygen discharge indicator in communication with the delivery device.

In another aspect, the system further includes a time delay circuit in communication with orifice metering device and further in communication with a breath sensor, with the time delay circuit configured to determine the duration of a pulsed oxygen flow.

In another aspect, the system is configured for use by an individual user.

In a further aspect, the system is configured for use by a plurality of users.

In another aspect, the mechanical oxygen supply initiator is configured to be activated mechanically.

In a further aspect, the orifice metering device is configured to determine ambient pressure in an aircraft cabin.

In another aspect, an object includes the aforementioned system, with the object being at least one of an aircraft, a spacecraft, a rotorcraft, and a satellite.

In another aspect, the portable object includes the aforementioned system.

According to further aspects, a method is disclosed including determining an oxygen demand of a user, said oxygen demand of a user based on a user inhalation activation, said user inhalation activation determined by a breath sensor, determining the oxygen demand of the user based on determined ambient pressure of a region inhabited by the user, and mechanically releasing on demand a predetermined dose of oxygen in response to the determined oxygen demand based on the inhalation activation of the user as determined by the breath sensor and as determined by the ambient pressure of the region inhabited by the user.

In another aspect, the method further includes directing the predetermined dose of oxygen to the user.

In another aspect, in the step of mechanically releasing on demand a predetermined dose of oxygen in response to the determined oxygen demand, the method does not employ electrical power.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
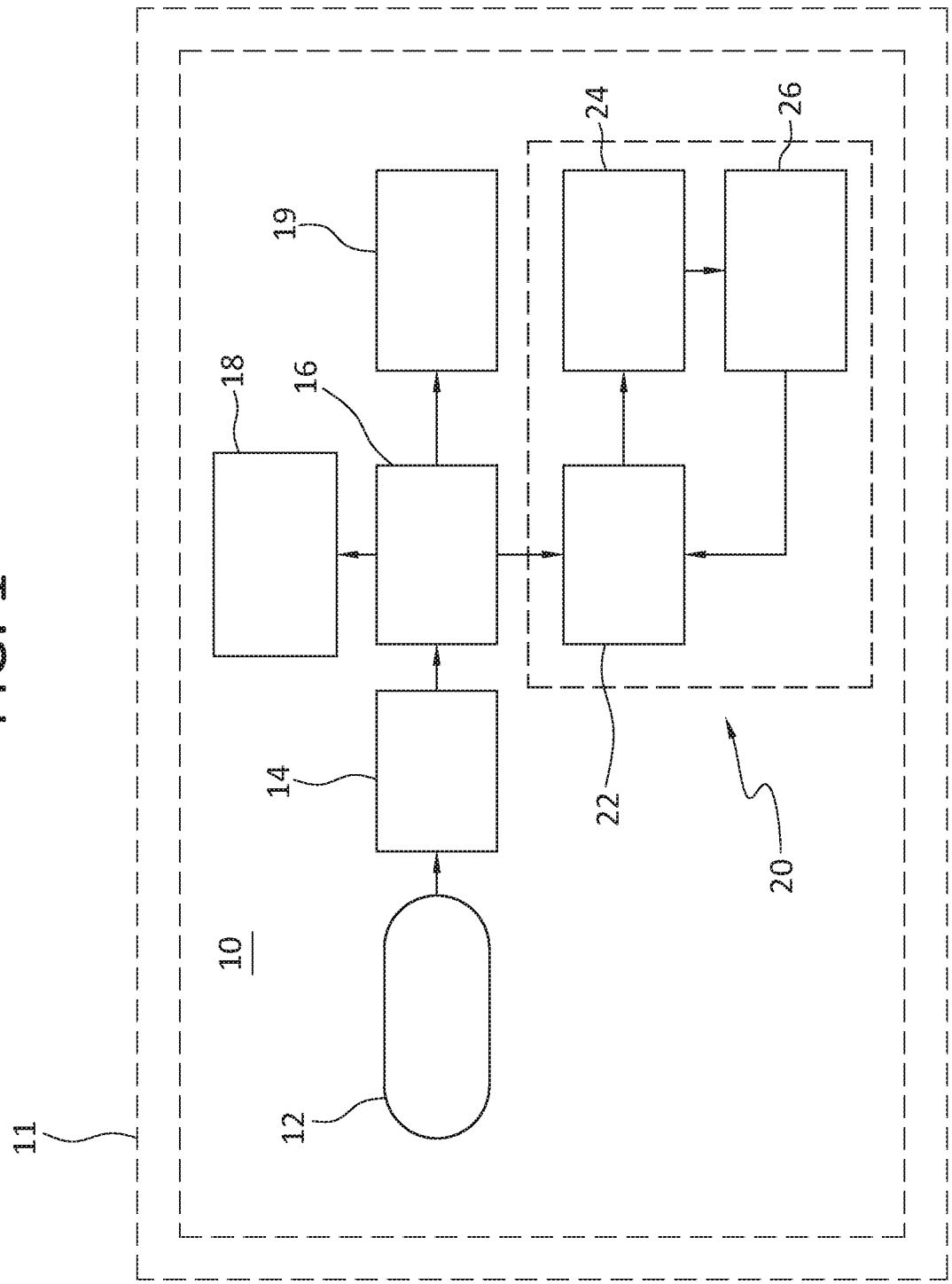
Figure 2:
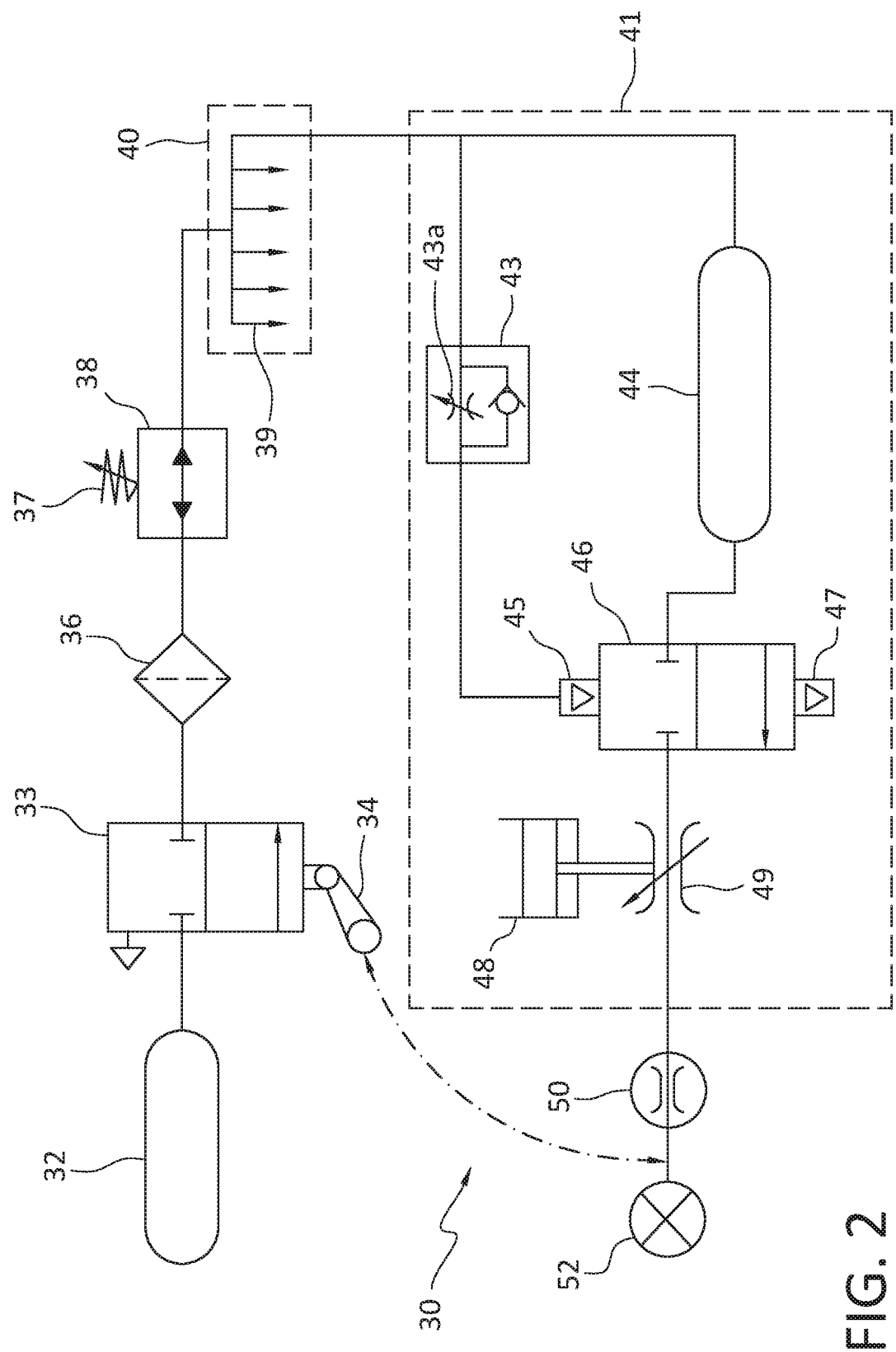
Figure 3:
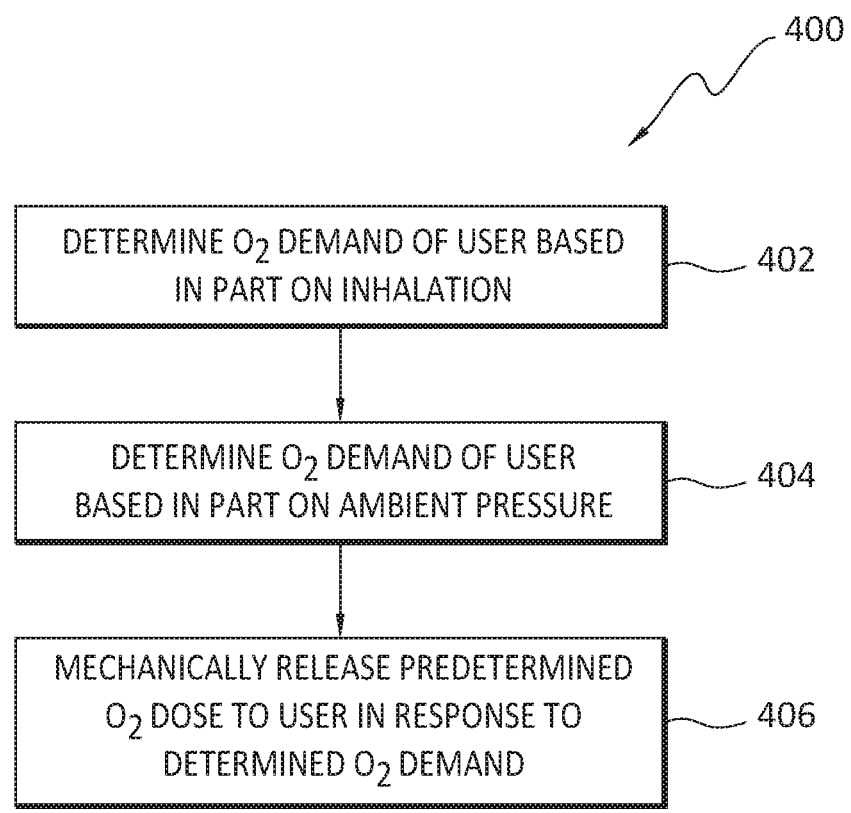
Figure 4:
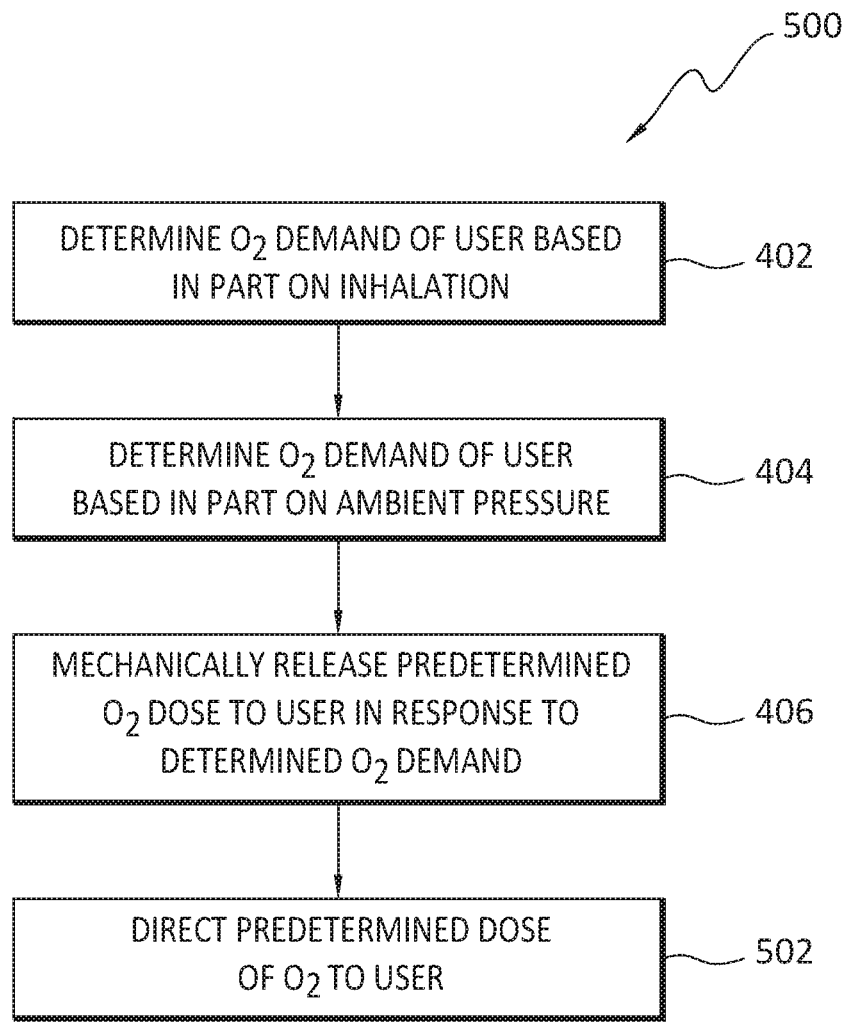

Having thus described variations of the disclosure in general terms, reference will now be made to the accompanying drawings, which are not necessarily drawn to scale, and wherein:

FIG. 1 is a block diagram illustrating an apparatus, system, and method according to a present aspect;

FIG. 2 is a schematic drawing illustrating an apparatus, system, and method according to a present aspect;

FIG. 3 is a flowchart illustrating a method according to a present aspect;

FIG. 4 is a flowchart illustrating a method according to a present aspect;

FIG. 5 is an illustration of an object in the form of a vehicle, and further in the form of an aircraft including an apparatus and/or system according to a present aspect; and FIG. 6 is an illustration of an object in the form of a portable object for personal use, including an apparatus and/or system according to a present aspect.

DETAILED DESCRIPTION

Typical oxygen dispensing systems have a largely unrestricted flow of oxygen flow that is typically controlled and/or initiated by a primary or secondary aircraft electrical system. Such systems require the accompanying electrical hardware including, for example, electrical wiring, electrical circuitry, etc. Such systems dependent on electrical connection can further require the presence of auxiliary or "backup" electrical systems (e.g., auxiliary battery-powered systems) if a primary loss of electrical power occurs. The electrical components can add significant weight to a large structure such as, for example, an aircraft. Further, the weight of oxygen cylinder and the number of oxygen cylinders required to dispense the typical uninterrupted flow of oxygen to aircraft passengers during a decompression event further adds total weight to the aircraft, that can increase cost, limit payload, limit aircraft range, increase fuel consumption, and otherwise increase operational cost, etc.

Present aspects disclose apparatuses, systems, and methods for increasing the efficiency of the delivery of oxygen on-demand to a user through the conserved and customized release of oxygen to an individual user through an on-demand, mechanically controlled, oxygen delivery system that senses point-to-point demand by a user and that accounts for the altitude pressure of a user to, in combination, regulate oxygen flow and delivery to a user.

Further present aspects disclose an on-demand oxygen delivery system to a user that is mechanically driven (e.g., pneumatically driven without electrical assistance, etc.), and that conserves oxygen, with oxygen dosages from the system delivered to a user based on "sensed" or determined demand, with the system delivering oxygen dosages to a user based, at least in part, on predetermined oxygen requirements of a user based on altitude pressure (also equivalently referred to herein as "ambient pressure"), with the systems adjusting regulated oxygen dosages that are delivered mechanically on-demand based on perceived (e.g., sensed) altitude pressure at the location of the user.

FIG. 1 is a non-limiting illustration showing an apparatus 10 for delivering oxygen to a user according to present aspects. The apparatus 10 includes an oxygen source 12, shown in FIG. 1, in non-limiting fashion, as an oxygen cylinder, although present aspects also contemplate an oxygen source that is provided to the apparatus from a source other than an oxygen cylinder. The apparatus 10 can be included within, or as a part of, a larger apparatus such as, for example, an aircraft passenger service unit 11 (referred to equivalently herein as an "aircraft PSU"). The oxygen source, as shown in FIG. 1 is in communication with a rupture disk 14 that, when ruptured facilitates an oxygen flow to a regulator 16. The rupture disk 14, shown in FIG. 1 as a separate component, can also be incorporated into the oxygen source, or incorporated into a component other than the oxygen source that is in communication with the oxygen source for the purpose of containing oxygen in a source, and then facilitating the release of an oxygen flow from the oxygen source once the rupture disk is pierced. In FIG. 1, the regulator 16 is shown in communication with: 1) an oxygen discharge indicator 18; 2) an oxygen flow control unit 20 (referred to equivalently herein as a "flow control unit"); and, a mechanical initiator 19. According to alternate aspects, though not explicitly shown in FIG. 1, the rupture disk 14 and the oxygen discharge indicator 18 can be incorporated into other components in the apparatus 10, and not be discrete elements.

As shown in FIG. 1, the regulator 16 can be of a type used to regulate oxygen flow from an oxygen source, through an oxygen delivery system and to a delivery device accessible by an end user. As shown in FIG. 1, the oxygen flow control unit 20 includes a time delay circuit 22 that can be in communication with the regulator 16, with the time delay circuit at least partially controlling the flow of oxygen that can be a pulsed flow of oxygen, An orifice metering device 24 that can be, for example, an aneroid orifice meter, etc., is shown in communication with the time delay circuit 22 and further in communication with a breath sensor 26.

As further shown in FIG. 1, a breath sensor 26 is in communication with the time delay circuit 22, with the breath sensor 26 capable of sensing a breath demand of a user via sensing inhalation demand of a user, and the breath sensor 26 can generate a signal, and deliver the signal to the time delay circuit 22. Breath sensor 26 detects, or otherwise "senses", a user's breath demand as a localized change in pressure triggered, for example, by a user's act of inhalation (referred to equivalently herein as a "user's inhalation" or "inhalation force"). The oxygen discharge indicator can be in communication with, or, e.g., integrated into, a delivery device 52, as shown in FIG. 2, (e.g., a mask of the type to be worn, for example, by a user requiring supplemental oxygen delivery, etc.)

According to present aspects, an aircraft personal service unit (PSU) 11, shown in FIGS. 1, is understood to be an aircraft component situated, for example, in the overhead panel above passenger seats, for example, in the cabin of a passenger aircraft. Among other things, a PSU can contain, for example, reading lights, loudspeakers, illuminated signs, buttons to call for assistance, air conditioning vents, automatically deployed oxygen masks, etc.

During a cabin decompression event, presently disclosed systems and apparatuses regulate and deliver oxygen flow on demand and in an amount commensurate with an individual user's need based on, in combination, a user's breath demand and the pressure altitude (e.g. ambient pressure) of the environment inhabited by the user. According to present aspects, ambient pressure can be determined by orifice metering device (e.g., an aneroid bellows metering device). The orifice metering device senses the ambient pressure and determines the appropriate amount of oxygen flow to be delivered to a user (via controlling at least in part, for example, volume, flow rate, etc.) based on the oxygen delivery/dispensing requirements of a user at a particular pressure altitude.

According to present aspects, the incorporation and operation of the orifice metering device in the presently disclosed apparatuses and systems helps to facilitate the conservation of oxygen dispensed during, for example, a cabin decompression event. According to further present aspects, oxygen conservation and oxygen delivery efficiency is significantly enhanced by also regulating the present systems, apparatuses, and methods by taking into consideration an individual user breath demand by sensing user inhalation via an incorporated breath sensor that that senses and determines, for example, a user's breath demand in terms of, for example, breath rate, breath volume, breath force (e.g., that can determined as a function of negative pressure created by an inhalation from an oxygen delivery device such as, for example, a mask, etc.), etc. A signal is then generated by the breath sensor and delivered to the oxygen control unit that receives the signal from the breath sensor.

FIG. 2 is a non-limiting schematic illustration showing further present aspects, including further detail for a system an oxygen delivery circuit that is used to mechanically drive presently disclosed apparatuses and systems. As shown in FIG. 2, system 30 includes an oxygen source 32, shown in FIG. 2, in non-limiting fashion, as an oxygen cylinder, although present aspects also contemplate an oxygen source provided from a source other than an oxygen cylinder. The oxygen source 32, as shown in FIG. 2, is in direct communication along a single line with a mechanical initiator 34 (e.g., an initiator that is mechanically driven, as opposed to an initiator that is electrically driven), with the mechanical initiator 34 including a valve 33 that can be a one-way valve, and an exhaust vent.

In the case of an aircraft incorporating presently disclosed systems and apparatuses, in operation, for example, during a decompression event a user (e.g., a passenger) manually activates the mechanical initiator 34, as shown in FIG. 2 as a "broken line" between the user (proximate to the delivery device 52 in a deployed state and the valve 33 in communication with the mechanical initiator 34. Through the manual activation of the mechanical initiator results in the piercing of a seal (e.g. a rupture disk, etc.) releasing a flow of oxygen from the oxygen source 32 into the system 30. The released oxygen flows from the mechanical initiator and passes through filter 36 that can be any suitable oxygen filtration device for the purpose of increasing the purity of oxygen released from the oxygen source. After passing through the filter 36, the oxygen flow is delivered to a regulator 38, with the regulator comprising a flow control 37. Flow control 37 can reduce or otherwise adjust the pressure of the oxygen from an oxygen release pressure (e.g., the pressure of contained oxygen in the oxygen source) of about 3000 psi to a system pressure that can be about, for example 25 psi.

FIG. 2 further shows the oxygen supply proceeding to manifold 40 that can separate and deliver a regulated amount of oxygen flow to multiple outlets 39, with the outlets 39 feeding the oxygen control units 41. Oxygen control units 41, as shown in FIG. 2, further include an oxygen dosing chamber 44 that can be maintained at a predetermined pressure that can be at least partially filled and at least partially emptied in response to user demand as sensed by breath sensor 46. A time delay circuit 43 (with time delay circuit orifice 43a) is shown in communication with the oxygen flow and the breath sensor 46, such that, when oxygen demand (in the form of user inhalation) is sensed by the breath sensor 46, a signal is sent to the time delay circuit to coincide with a pulsed release from the oxygen dosing chamber 44. The breath sensor further includes a breathing diaphragm 47 that opens on demand to deliver oxygen flow to a user on demand in response to user inhalation, and a conservation diaphragm 45 that closes at the end of a user inhalation (e.g., the end of an inhalation includes the duration between a user's consecutive breaths) for the purpose of conserving (e.g. terminating) oxygen flow to a user from the oxygen control unit.

Orifice metering device 48 then adjusts the pulsed oxygen flow leaving the dosing chamber 44 to compensate for the amount of oxygen that is to be delivered to the user at a perceived pressure altitude (ambient pressure). The combination of the orifice metering device (to account for ambient pressure and adjust the oxygen flow accordingly) and the breath sensor activated pulse control (to deliver an oxygen flow, as determined by present systems, and based on a user's inhalation) results in a, safe delivery of pressure adjusted oxygen to a user, on demand, and in according to the individualized "sensed breath" demand of an individual user.

The delivery device 52 of the type shown in FIG. 2, and that can be, for example, a mask, receives the predetermined and conserved dose of oxygen flow from the oxygen source (e.g., an on-demand, pulsed, oxygen flow resulting from a detected, consumed breath of a user that is adjusted for ambient pressure) through the systems, apparatuses, and methods according to present aspects, and as described herein. Oxygen discharge indicator 50 can be any device to indicate a flow of oxygen is being delivered from system 30 via flow control orifice 49. and although shown in FIG. 2 as a discrete device, oxygen discharge indicator 50 can be incorporated into another device, such as, for example, a device visible to a user and incorporated in the PSU, the mask/delivery device, etc.

The present apparatuses and systems can be placed into communication with an aircraft databus that collects and distributes aircraft data, including aircraft status data, with the aircraft databus able to send a signal to features of the presently disclosed systems and apparatuses. For example, information received from an aircraft databus can, for example, trigger the mechanical release of the delivery device into the proximity of an aircraft passenger, for example, in the event of a decompression event.

Further aspects contemplate the incorporation of one or more of: the oxygen control device, the components in the oxygen control unit, the oxygen discharge indicator, and a mask, into a unitary oxygen flow delivery device. In further present aspects, the delivery device, as shown in FIG. 2, is a discrete unit that can be considered as separate from the aforementioned oxygen delivery system and/or apparatus.

As stated herein, presently disclosed systems and apparatuses operate independently from, for example, an aircraft electrical system. Further present aspects, relating to the contemplated incorporation of the mechanically driven oxygen flow initiator (e.g. a mechanical initiator), obviate the need for a supplemental (e.g., a "back-up" or "reserve") electrical system that can be dedicated to an oxygen delivery system, for example, in case of a main and/or supplemental electrical system interruption.

Such presently disclosed aspects greatly simplify known oxygen delivery systems requiring electrical operation. According to further aspects, the simplification of presently disclosed systems and apparatuses afforded by incorporating mechanically driven apparatuses, contributes to a significant weight reduction of an oxygen delivery system by, for example, obviating the need for electrical wiring into, for example, an aircraft's main electrical system, etc. Overall system weight reduction is further realized due to the conservation of expended oxygen due to the on-demand delivery and release of oxygen to a user based, in part, to the sensed cyclical inhalation breathing demand of an individual user and the system regulation and adjustment of oxygen delivery to a user based, in part, on the "sensed" ambient pressure of the user's location.

FIG. 3, 4 are flowcharts outlining non-limiting methods according to present aspects. As shown in FIG. 3, a method 400 is outlined according to present aspects, with the method including determining 402 the oxygen demand of a user based, in part, on inhalation or breath demand of a user, determining 404 the oxygen demand of a user based, in part on the ambient pressure, and mechanically releasing 406 a predetermined oxygen dose to the user in response to the determined oxygen demand.

As shown in FIG. 4, a method 500 is outlined according to present aspects, with the method including determining 402 the oxygen demand of a user based, in part, on inhalation or breath demand of a user, determining 404 the oxygen demand of a user based, in part on the ambient pressure, mechanically releasing 406 a predetermined oxygen dose to the user in response to the determined oxygen demand, and directing 502 a predetermined dose of oxygen to the user. The apparatuses and systems disclosed herein can be implemented in any of the methods according to present aspects, and as illustrated in FIGS. 3 and/or 4.

The presently disclosed methods, systems, and apparatuses deliver a predetermined amount of oxygen (e.g., the predetermined amount referred to equivalently here as a "bolus" or "dose" or "dosage" of oxygen) to a user at a rate and at a total volume in substantially real time that is directly in response to user demand in combination with recognition by the system of the current altitude (referred to equivalently herein as the ambient altitude). By delivering an oxygen dosage that is pulsed in substantially real time in response to a user's breath or inhalation demand, considerable savings are realized as the system does not deliver a continuous and uninterrupted free flow of oxygen, and instead delivers a "right-sized" amount of pulsed oxygen in response to the user's breath demand, on-demand, in combination with an oxygen release from the system that is also conditioned or regulated according to the system and apparatus determining pressure altitude (e.g., ambient pressure) of a location inhabited by a user, and that can account for and deliver an appropriate oxygen dosage during, for example, rapid or progressive ascent or descent as well as a decompression event (in the case of, for example, an aircraft). The term "substantially real time", for present purposes, is understood to represent an amount of time that is less than about 0.5 seconds.

Present aspects contemplate incorporating the presently disclosed systems in objects that can be subject to high altitudes and altitudes that vary over the course of a mission or event including, for example, an aircraft flight, a climbing ascent and descent, etc. Accordingly, FIGS. 5 and 6 illustrate, in non-limiting fashion, objects that can include the systems and apparatuses according to present aspects as shown in FIGS. 1 and/or 2, and that can incorporate the methods as outlined in FIGS. 3 and/or 4.

FIG. 5 shows a vehicle in the form of an aircraft 80 that can incorporate the presented apparatuses, systems, and methods according to present aspects. In the case of an aircraft, the systems and apparatuses can be at least partially contained within or located proximate to an aircraft PSU of the kind typically located within or proximate to an overhead compartment and that can be positioned above an occupant/passenger/user. In a decompression event, an oxygen delivery device (e.g., a mask) is deployed from the PSU, and it is contemplated that the delivery device can be fashioned into the form of an oxygen mask dimensioned to at least partially cover a user's airway (e.g., mouth and/or nose). The presently disclosed apparatuses and/or systems can be incorporated in variable altitude vehicles including at least one: aircraft, spacecraft, rotorcraft, a satellite, and combinations thereof.

Present aspects can also be directed to apparatuses, systems, and methods for delivering oxygen dosages in a portable oxygen delivery device to a user, for example, a user engaged in an altitude altering activity where supplemental oxygen is desirable including, for example, high altitude climbing, high altitude hiking, high altitude skiing, skydiving, ballooning, etc. Accordingly, present aspects contemplate the delivery of a predetermined and individualized/personalized dosage of oxygen from an oxygen source, with the amount of oxygen that is released to the user as a conserved oxygen dosage or dose delivered to the user from the oxygen source in response to the respiratory demand of the user (e.g., the breath, inhalation rate and volume, etc. on-demand and in substantially real time) in combination with the oxygen delivery regulated according to the current ambient pressure inhabited by the user, with the conserved oxygen delivery achieved in substantially real time.

As shown in FIG. 6, a portable oxygen delivery device 90 in the form of an exemplary backpack includes an oxygen source 92 shown as being contained within the portable oxygen delivery device 90. In aspects, not shown, such oxygen source can be located and secured to the exterior of the portable oxygen delivery device. The oxygen source 92 is in communication with a delivery device 94 (e.g., shown as a mask) via tube 96, with the system triggered mechanically by a user, and with oxygen doses regulated by the system and apparatus to deliver an oxygen dose to the user based on 1) the user's pressure altitude (e.g., ambient pressure) as detected by the system; and 2) a user's inhalation as detected by a breath sensor. As with the systems, apparatuses, and methods described in the context of oxygen delivery and oxygen delivery conservation in an aircraft depressurization event, the personal systems and apparatuses shown in non-limiting fashion in FIG. 6 provide a user the benefits of a mechanically-triggered conserved oxygen flow, with the total oxygen flow and oxygen system consumption conserved through the individualized needs of the user in terms of delivering an oxygen flow based on user consumption as sensed by a breath sensor combined with oxygen delivery being further regulated (and conserved) in response to the detected ambient pressure of the user's surroundings. According to present aspects, the portable oxygen delivery device contains the apparatuses and systems described herein and shown in FIGS. 1 and 2, and incorporating the outlined methods presented in FIGS. 3 and 4.

The present aspects can, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A system for mechanically dispensing an individualized and personalized oxygen bolus to an individual user within an aircraft, said system comprising:
   an oxygen source;
   a mechanical oxygen supply initiator, said mechanical oxygen supply initiator in communication with the oxygen source;
   a manifold, said manifold comprising a manifold outlet;

a regulator, said regulator located upstream of the manifold, said regulator in communication with the mechanical oxygen supply initiator, said regulator configured to reduce an oxygen release pressure from the oxygen source from about 3000 psi to about 25 psi;

an oxygen control unit, said oxygen control unit in direct communication with the manifold outlet, said oxygen control unit comprising:

an orifice metering device, said orifice metering device configured to determine an ambient pressure at the location of the individual user, and the orifice metering device further configured to produce a conserved oxygen flow in response to the ambient pressure of the location of the individual user;

an oxygen dosing chamber in communication with the manifold outlet, said oxygen dosing chamber configured to receive oxygen from the manifold, said oxygen dosing chamber further configured to deliver the individualized and personalized oxygen bolus from the oxygen dosing chamber to the individual user;

a breath volume sensor, said breath volume sensor in communication with the orifice metering device, said breath volume sensor configured to sense an individual user breath volume demand of the individual user, said breath volume sensor further configured to generate and send a signal to a time delay circuit of the oxygen control unit, said signal generated and sent to the time delay circuit in response to the individual user breath volume demand, said time delay circuit configured to adjust a release of oxygen flow out from the oxygen dosing chamber in response to the sensed individual user breath volume demand of the individual user;

wherein the orifice metering device is positioned downstream from the breath volume sensor, and the breath volume sensor is located downstream from the oxygen dosing chamber;

an oxygen delivery device in communication with the orifice metering device, said oxygen delivery device further in communication with the breath volume sensor, said oxygen delivery device further in communication with the oxygen dosing chamber, said oxygen delivery device configured to receive the individualized and personalized oxygen bolus from the oxygen control unit;

wherein said system for mechanically dispensing the individualized and personalized oxygen bolus to the individual user is configured to operate without electrical assistance and is further configured to operate independently from an aircraft electrical system of the aircraft;

wherein said regulator is located upstream of and discrete from the oxygen control unit; and wherein the oxygen dosing chamber is configured to mechanically release to the orifice metering device the oxygen delivered from the outlet of the manifold and received into said oxygen control unit, said individualized and personalized oxygen bolus further configured to be delivered from the oxygen dosing chamber to the individual user via said orifice metering device, said individualized and personalized oxygen bolus further based in combination on the individual user breath volume demand of the individual user and the determined ambient pressure of the location of the individual user.

2. The system of claim 1, further comprising:
an oxygen discharge indicator, said oxygen discharge indicator in communication with the oxygen delivery device.

3. The system of claim 2, wherein said oxygen delivery device is a mask, and wherein said oxygen discharge indicator is integrated into said oxygen delivery device.

4. The system of claim 1, wherein the individual user is one of a plurality of individual users, wherein the system comprises separate oxygen control units for each of the plurality of individual users.

5. The system of claim 1, wherein the oxygen delivery device comprises a mask.

6. The system of claim 1, wherein the mechanical oxygen supply initiator is configured to be activated without electrical assistance.

7. The system of claim 1, wherein the orifice metering device comprises an aneroid metering device.

8. An aircraft personal service unit comprising the system of claim 1.

9. An aircraft comprising the system of claim 1.

10. An object comprising the system of claim 1.

11. The object of claim 10, wherein the object is at least one of:
an aircraft; a spacecraft; a rotorcraft, and a satellite.

12. The object of claim 10, wherein the orifice metering device is configured to determine ambient pressure at the location of the individual user within an aircraft cabin of the aircraft.

13. A system for mechanically dispensing an individualized and personalized oxygen bolus to an individual user within an aircraft, said system comprising:
a delivery device configured to supply oxygen to the user;
an oxygen source that contains a supply of the oxygen;
a valve positioned downstream from the oxygen source to control a flow of oxygen from the oxygen source;
a regulator positioned downstream from the valve, the regulator configured to reduce a pressure of the oxygen;
a manifold positioned downstream from the regulator, the manifold comprising an inlet that is configured to receive the oxygen that flows through the regulator, the manifold further comprising a plurality of outlets;
a control unit that is configured to receive the oxygen from one of the outlets, the control unit comprising:
an oxygen dosing chamber that is configured to receive the oxygen from the one outlet;
a breath volume sensor positioned downstream from the oxygen dosing chamber and configured to sense a demand for the oxygen at the delivery device, the breath volume sensor comprising a breathing diaphragm that is configured to open to deliver the oxygen on demand to user inhalation at the delivery device, and a conservation diaphragm that is configured to close at an end of the user inhalation;
a time delay circuit positioned between the manifold and the breath volume sensor, the time delay circuit configured to be in communication with the oxygen upstream from the manifold;
an orifice metering device positioned between the breath volume sensor and the delivery device, the orifice metering device configured to adjust the flow of the oxygen exiting the oxygen dosing chamber to compensate for ambient pressure.

14. The system of claim 13, further comprising an initiator comprising the valve configured to be manually operated to release a flow of oxygen from the oxygen source.

15. The system of claim 13, wherein the initiator is a one-way valve.

16. The system of claim 13, further comprising a filter positioned upstream from the regulator.

17. The system of claim 13, wherein the oxygen dosing chamber is configured to maintain the oxygen at a predetermined pressure.

18. The system of claim 13, wherein the time delay circuit is positioned in parallel with the oxygen dosing chamber.

19. The system of claim 13, wherein the control unit is a first control unit and further comprising one or more additional control units that are each configured to receive the oxygen from a different one of the outlets of the manifold.

20. The system of claim 13, further comprising a discharge indicator positioned downstream from the orifice metering device, the discharge indicator configured to indicate the flow of oxygen from the control unit.

\* \* \* \* \*